(12) United States Patent
Knox

(10) Patent No.: US 9,211,835 B2
(45) Date of Patent: Dec. 15, 2015

(54) SUPPORT SYSTEM FOR A BULKHEAD

(71) Applicant: Ancra International LLC, Azusa, CA (US)

(72) Inventor: H. Thomas Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 14/552,046

(22) Filed: Nov. 24, 2014

(65) Prior Publication Data

US 2015/0151667 A1 Jun. 4, 2015

Related U.S. Application Data

(60) Provisional application No. 61/910,517, filed on Dec. 2, 2013.

(51) Int. Cl.
*B60P 7/08* (2006.01)
*B60P 7/14* (2006.01)

(52) U.S. Cl.
CPC .................................. *B60P 7/14* (2013.01)

(58) Field of Classification Search
CPC .................................. B60P 7/14; B60P 7/15
USPC ......... 410/130, 131, 132, 141, 142, 144, 145, 410/149, 150, 151; 74/167
See application file for complete search history.

(56) References Cited

U.S. PATENT DOCUMENTS

| | | |
|---|---|---|
| 2,669,402 A | 2/1954 | Del Mar |
| 3,282,229 A | 11/1966 | Elsner |
| 3,486,723 A | 12/1969 | Harrison |
| 3,836,174 A | 9/1974 | Holman, Jr. |
| 4,079,677 A | 3/1978 | Vandergriff et al. |
| 4,265,577 A | 5/1981 | Loomis |
| 4,345,734 A | 8/1982 | Studinger |
| 4,781,498 A | 11/1988 | Cox |
| 4,867,623 A | 9/1989 | Loyd |
| 4,880,342 A | 11/1989 | Pradovic |
| 4,986,706 A | 1/1991 | Williams, Jr. |
| 5,104,269 A | 4/1992 | Hardison |
| 5,338,137 A | 8/1994 | Jensen |
| 5,833,413 A | 11/1998 | Cornelius |
| 5,941,667 A | 8/1999 | Hardison |

(Continued)

OTHER PUBLICATIONS

Ancra French language catalog, selected pages, publication unknown but believed to be published before Dec. 2, 2013, and English translation of same.

*Primary Examiner* — Stephen Gordon
(74) *Attorney, Agent, or Firm* — Brinks Gilson & Lione

(57) ABSTRACT

A system for supporting a removable bulkhead within a container. The system includes one or more arms that are removably fixed to opposed walls of the container. The arm includes a first arm, a second arm, a collar and an adjustment arm. Ends of the first and second arms are each disposed within the collar and the adjustment arm is engaged with the second arm. The collar includes opposed holders with bearing surfaces, with a shaft extending through the holder, and a spring disposed between the bearing surfaces. An end face of the first arm engages the bearing surface of the first holder, and an end face of the second arm engages the bearing surface of the second holder. Movement of the first arm linearly toward the second arm compresses the spring, which provides a resistance to compression and biases the first and second arms away from each other.

19 Claims, 6 Drawing Sheets

(56) References Cited

U.S. PATENT DOCUMENTS

| | | | |
|---|---|---|---|
| 6,074,143 A | 6/2000 | Langston et al. | |
| 6,152,664 A | 11/2000 | Dew et al. | |
| 6,364,583 B1 | 4/2002 | Koller | |
| 6,739,811 B1 | 5/2004 | Petelka | |
| 6,742,974 B2 | 6/2004 | Haire | |
| 6,824,341 B2 | 11/2004 | Ehrlich | |
| 6,895,867 B1 | 5/2005 | Burrows | |
| 6,935,819 B2 | 8/2005 | Squyres | |
| 6,981,828 B2 | 1/2006 | Davies et al. | |
| 7,134,820 B2 | 11/2006 | Ehrlich | |
| 7,357,610 B2 | 4/2008 | Squyres | |
| 7,578,644 B2 | 8/2009 | Squyres et al. | |
| 7,731,462 B2 | 6/2010 | Squyres et al. | |
| 8,172,494 B1 | 5/2012 | Knox | |
| 8,740,526 B2 | 6/2014 | Knox | |
| 8,757,944 B2 | 6/2014 | Calico | |
| 8,820,008 B2 | 9/2014 | Knox | |
| 2003/0231938 A1* | 12/2003 | Williams | 410/130 |
| 2004/0156692 A1 | 8/2004 | Rhodes | |
| 2008/0131227 A1 | 6/2008 | Maresh et al. | |
| 2013/0223949 A1 | 8/2013 | Garrigus et al. | |
| 2014/0109494 A1 | 4/2014 | Knox | |
| 2015/0110568 A1 | 4/2015 | Squyres | |
| 2015/0110569 A1 | 4/2015 | Squyres | |
| 2015/0110570 A1 | 4/2015 | Squyres | |
| 2015/0110571 A1 | 4/2015 | Squyres | |
| 2015/0110572 A1 | 4/2015 | Squyres | |

* cited by examiner

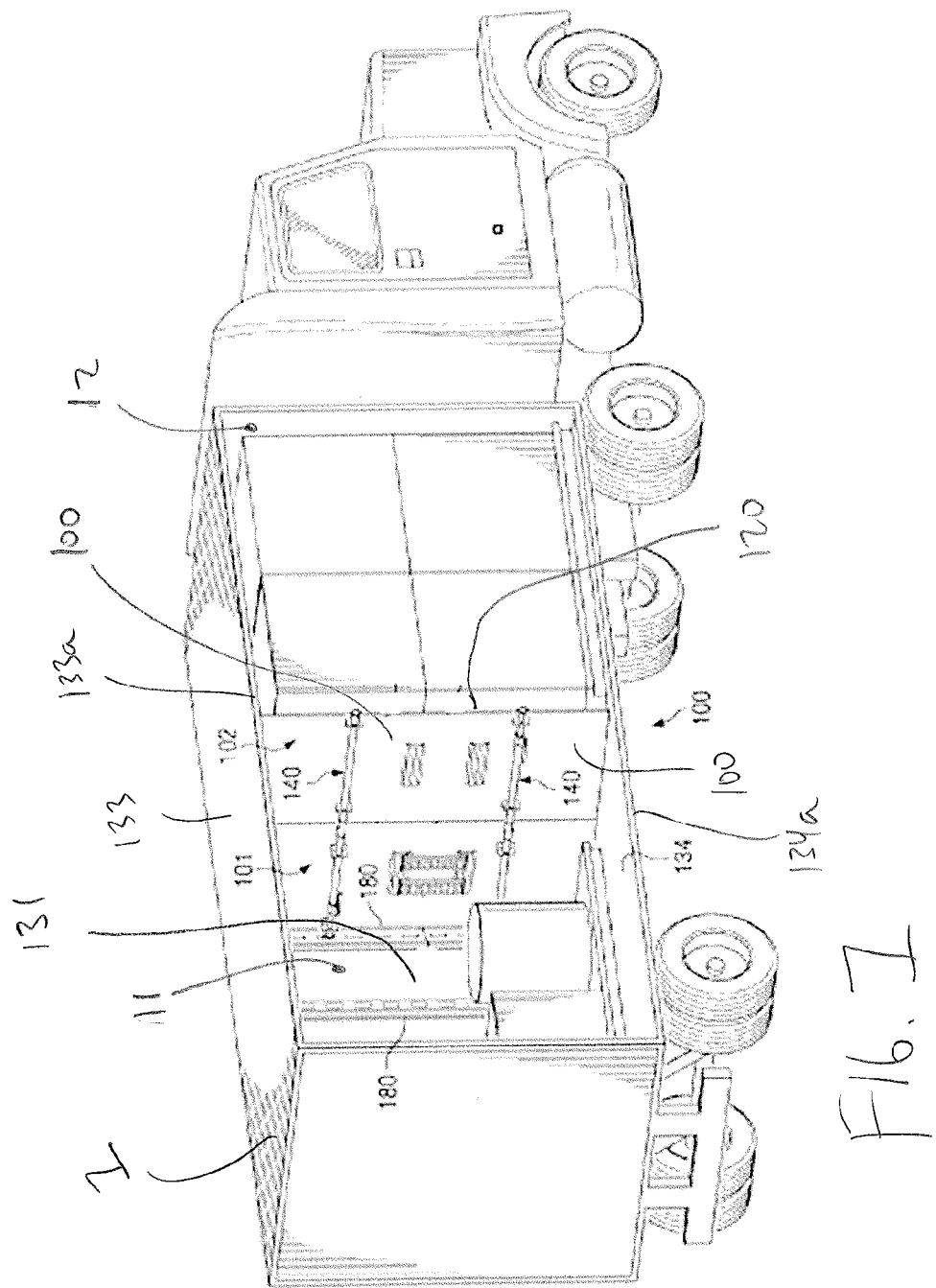

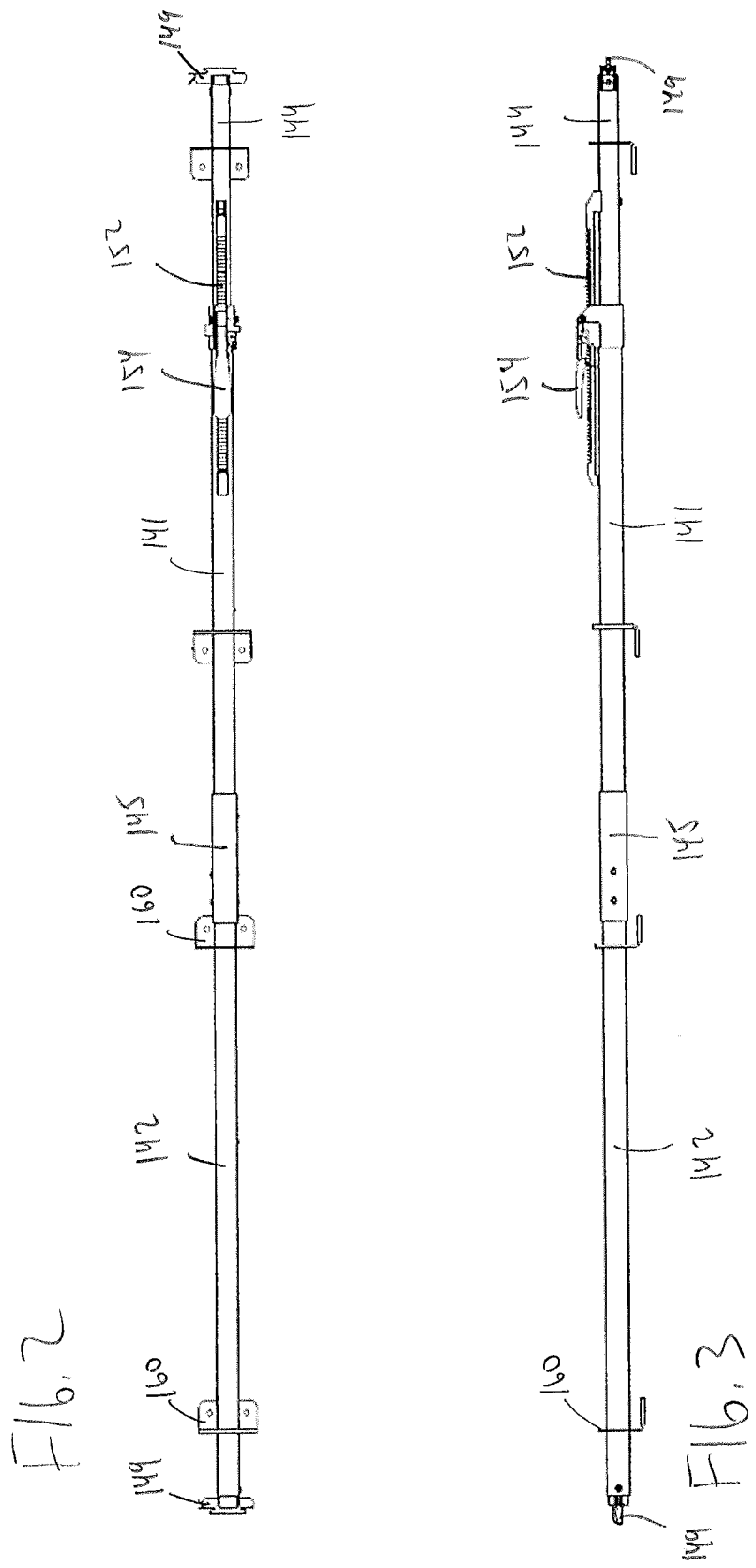

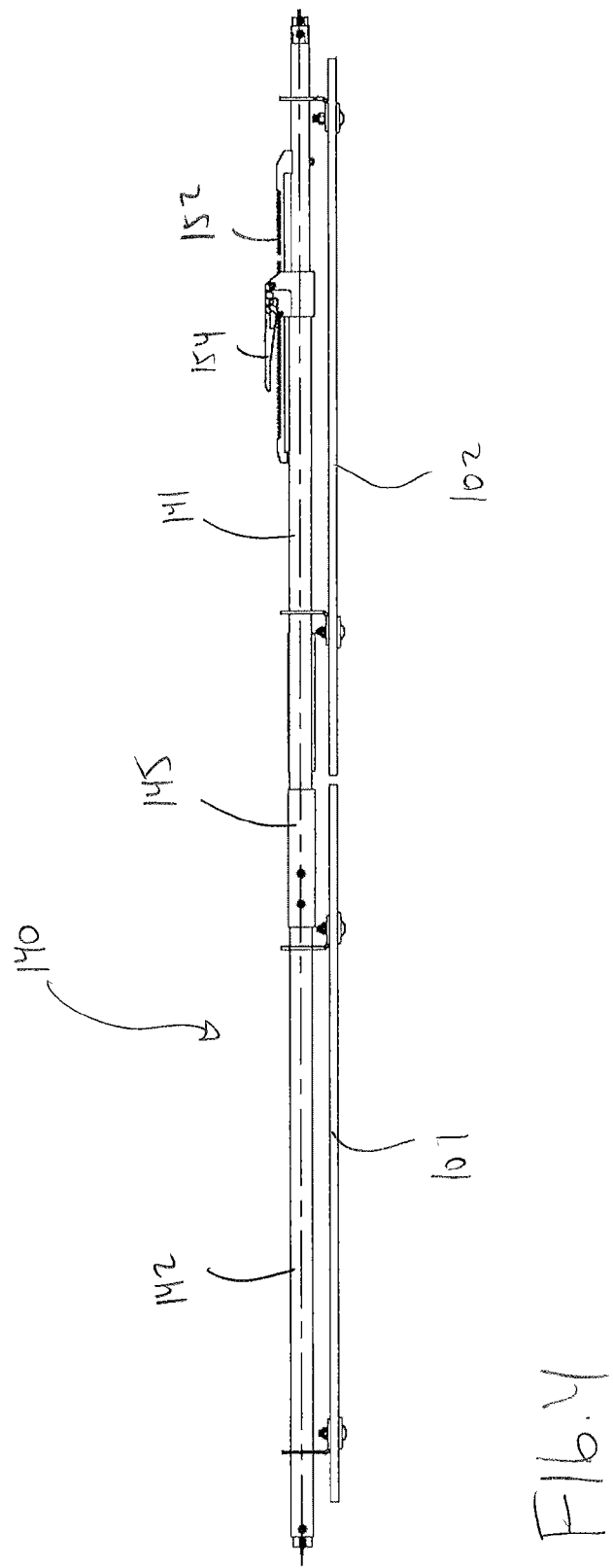

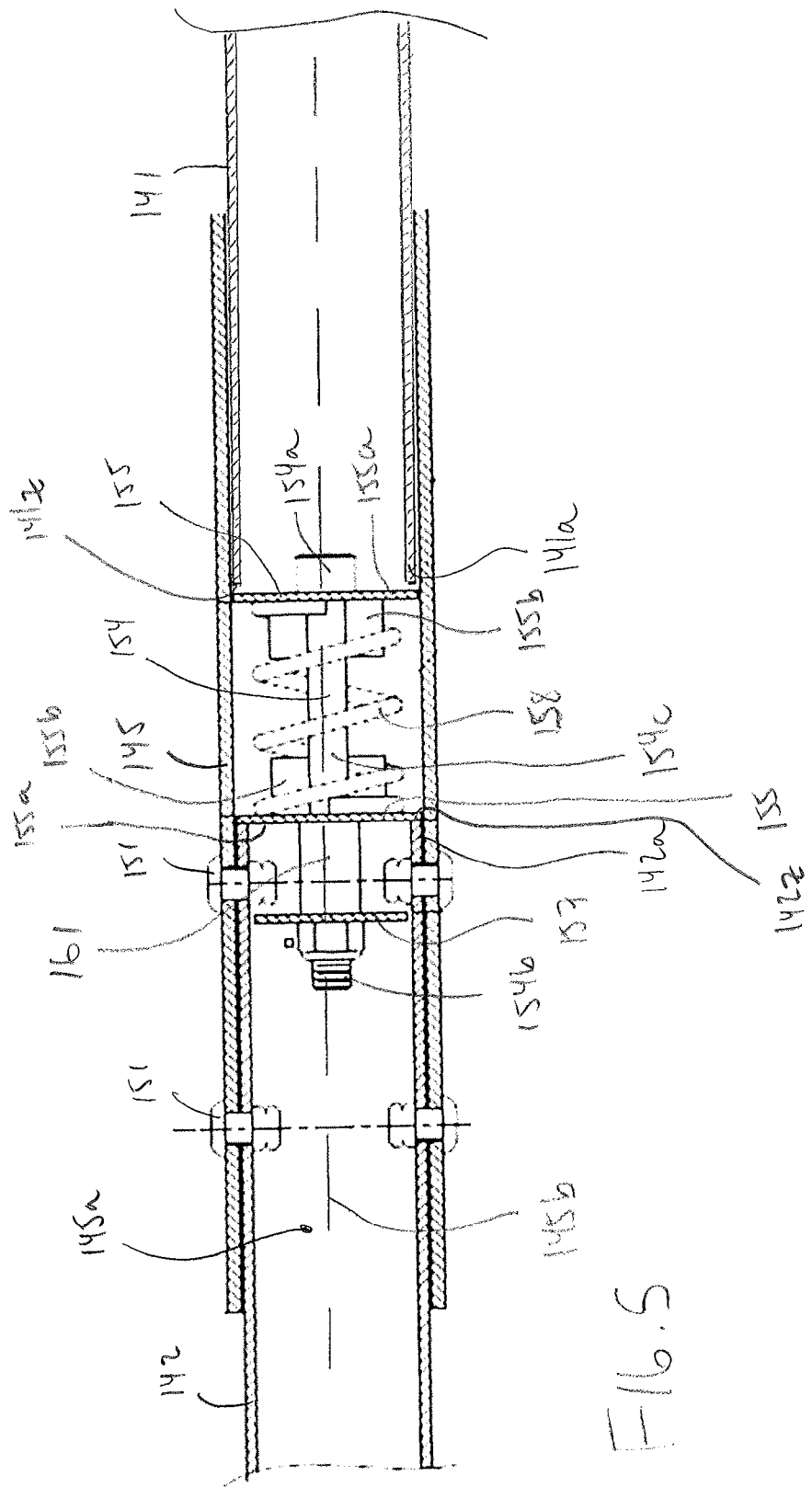

US 9,211,835 B2

SUPPORT SYSTEM FOR A BULKHEAD

CROSS-REFERENCE TO RELATED APPLICATIONS

This application claims priority from U.S. provisional application No. 61/910,517, filed on Dec. 2, 2013, the entirety of which is hereby fully incorporated by reference herein.

TECHNICAL FIELD

This disclosure relates to movable bulkheads for dividing a container into multiple separate volumes and structures for fixing the moveable bulkhead into place.

BRIEF SUMMARY

A first representative embodiment of the disclosure is provided. The embodiment includes a system for supporting a wall within a space. The system includes a bar assembly including an elongate first bar that extends between first and second ends, the first end of the first bar operatively engaged with a connector that is configured to engage a receipt structure on a first side wall of the space. An elongate second bar extends between first and second ends, with the first end of the second bar operatively engaged with a connector that is configured to engage a receipt structure on a second side wall of the space, opposite from the first side wall. A collar is provided with first and second opposite open ends and an inner volume, a second end of the first bar configured to extend through the first open end and be fixed within the inner volume. The collar further includes a bolt disposed within the inner volume of the collar, and first and second holders disposed with a shaft of the bolt extending therethrough, wherein the first and second holders comprise bearing surfaces, wherein an end face of the first bar engages the bearing surface of the second holder and an end face of the second bar engages the bearing surface of the first holder when the second bar is disposed within the internal volume of the collar.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 1 is a perspective view of a container with a side panel removed and a bulkhead supported by a plurality of bars.

FIG. 2 is a top view of a bar of FIG. 1.

FIG. 3 is the side view of the bar of FIG. 2.

FIG. 4 is a side view of the bar of FIG. 2 fixed to first and second bulkhead sections.

FIG. 5 is a cross-sectional view of a portion of the bar of FIG. 2 including ends of the first and second bars and a collar disposed therebetween.

DETAILED DESCRIPTION OF THE DRAWINGS AND THE PRESENTLY PREFERRED EMBODIMENTS

Figure 7:
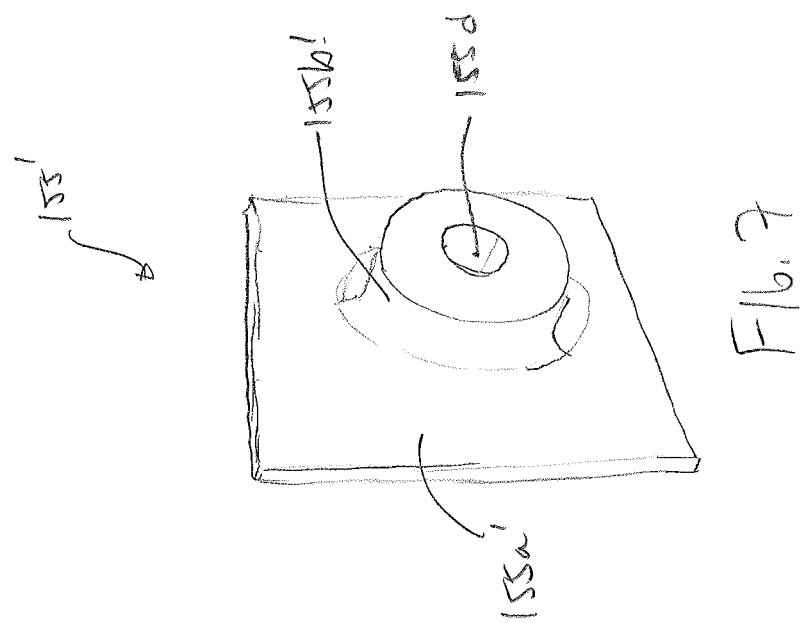
FIG. 7 is a perspective view of another holder usable with the collar of FIG. 5.

FIG. 1 is a perspective view of a bulkhead 100 for dividing a cargo container 1 into a first compartment 11 and a second compartment 12 in accordance with one embodiment of the present invention. The bulkhead 100 may include a first side 110 facing a first compartment 11 and a second side 120 facing the second compartment 12. The bulkhead 100 is configured to extend substantially from the first wall 131 of the cargo container 1 to an opposite second wall (similar but opposite to the first wall 131 and located below the right edge 133a of the top 133 of the cargo container and above the right edge 134a of the floor 134 of the cargo container 1). In some embodiments, the bulkhead 100 extends between the top 133 and the container floor 134, while in other embodiments, the bulkhead 100 might be fully or partially offset from one or both of the top 133 and the floor 134 of the container 1. Similarly, the bulkhead 100 may be partially offset from one or both of the first or second side walls.

The bulkhead 100 may be formed from one or more sections and, as shown, comprises a first section 101 and a second section 102, which may be disposed in a horizontal arrangement with a vertical edge therebetween, or in a vertical arrangement (one over the other) with a horizontal edge.

Figure 8:
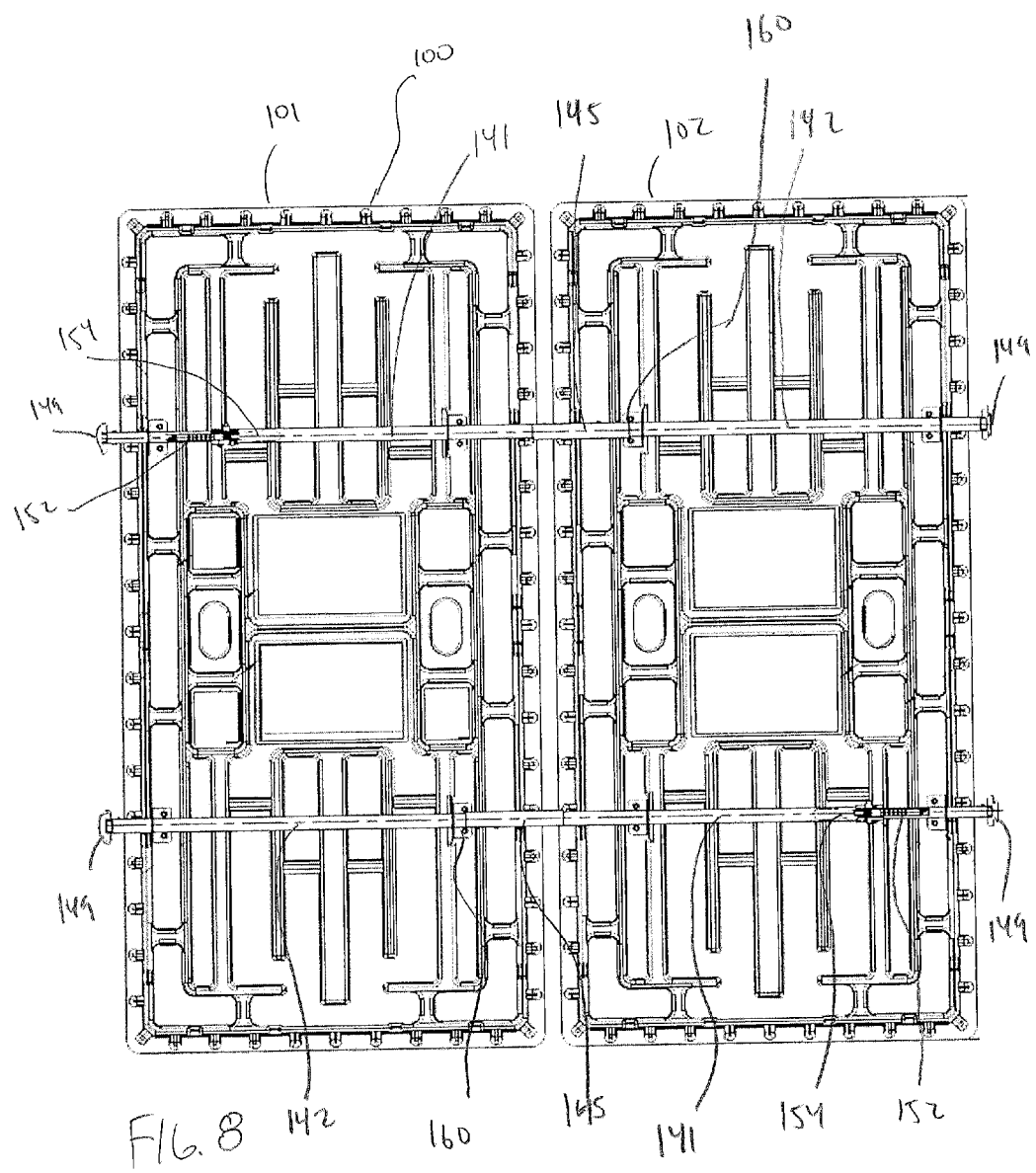
FIG. 8 is a side view of an alternative bulkhead supported by two bars of FIG. 2.

In some embodiments, the bulkhead may be a planar relatively thin material as shown in FIG. 1, such as one or more sheets of plywood, while in other embodiments, such as shown in FIG. 8, the bulkhead 100 may be molded into a geometric arrangement that may have better strength to weight characteristics, or an arrangement with thicker material (or a composite bulkhead with stronger material) at specific locations upon the bulkhead 100 that are anticipated to require higher localized strength than other portions of the bulkhead 100.

As shown in FIG. 1, the bulkhead 100 may be rigidly supported within the cargo container 1 with one or more bars 140 that extend between the first wall 131 to the second wall. In some embodiments, a single bar 140 may be used, while in other embodiments two similar bars 140 (FIG. 1) may be used, while other numbers of bars 140 may be implemented depending upon the forces that are expected to be imparted upon the bulkhead 100 during use or transport of the cargo container 1. In some embodiments, the bars are only mounted upon the first side 110 of the bulkhead. In embodiments where it is possible to access the second compartment 12 with the bulkhead 100 installed, one or more bars 140 may be positioned upon the second side 120 of the bulkhead 100, instead of, or in addition to the bar(s) upon the first side 110.

Referring to FIGS. 2 and 3, in one embodiment, the bar 140 further comprises a first bar 141 and a second bar 142, the first bar 141 and second bar 142 each being mounted together by a collar 145. The collar 145 can be integral with one of the first bar 141 or the second bar 142, or in other embodiments may be mechanically fixed one of the first bar 141 or the second bar 142, either with fasteners, adhesive, welding, or the like. Fasteners (such as bolts or rivets) may be preferred. In embodiments where the collar 145 is fixed to the first bar 141, the second bar 142 is slidably disposed into the internal volume 145a of the collar 145. Similarly, if the second bar 142 is fixed to the collar 145, the first bar 141 is slidably disposed into the internal volume 145a the collar 145. The first and second bars 141, 142 each enter the internal volume 145a through opposite ends of the collar 145. In other embodiments, neither the first and second bars 141, 142 are fixed to the collar 145, but ends of each of the first and second bars 141, 142 slidingly extend into the internal volume 145a of the collar 145. In one embodiment, the first bar 141, the second bar 142, and an adjustable bar 144 (discussed below) and the collar 145 are formed from extruded (or by other suitable manufacturing methods) aluminum. Of course, other suitable materials can be used for one or all of the bars 141, 142, 144 and the collar 145, such as steel, plastics, or composite materials that exhibit suitable strength and weight properties and can be purchased or manufactured for a suitable cost.

In one embodiment, as best depicted by the top view of FIG. 2 and the side views of FIGS. 3 and 4, an adjustable rack gear 152 may be fixed to an adjustable bar 144, which is slidingly disposed within a first end of the first bar 141. Although not shown, the bar 140 may be formed with the adjustable bar 144 fixed to the second bar 142 in the alternative.

The first bar 141 rigidly supports a paddle handle 154 that operatively interacts with the rack gear 152, such that engagement between the paddle handle 154 and the rack gear 152 fixes the relative position of the adjustable bar 144 with respect to the first bar 141. In some embodiments, the paddle handle 154 includes a plurality of spaced teeth which are shaped, sized, and aligned to mesh with the teeth of the rack gear 152 when the paddle handle 154 engages the rack gear 152. As can be understood, the meshing of the teeth of the paddle handle 154 and the teeth of the rack gear 152 prevents relative sliding motion between the adjustable bar 144 and the first bar 141. In some embodiments, the paddle handle 154 may be fixed in position, either with an internal locking structure, or with an external lock. In some embodiments, the paddle handle 154 is movably mounted upon the first bar 141 such that the paddle handle 154 is urged toward the rack gear 152 to maintain the opposing teeth meshed together when the paddle handle 154 is in a position close to engagement with the rack gear 152, while once the paddle handle 154 is moved away from engagement with the rack gear 152 for a specific range of motion, the paddle handle becomes biased away from engagement with the rack gear 152. The mechanism to selectively bias the paddle handle 154 toward or away from engagement with the rack gear 152 (depending upon the position of the paddle handle 154 with respect to the rack gear 152) may be with an eccentric cam and follower, an over center mechanism, or other known structures in the art. In other embodiments, the adjustment bar 144 and the first bar 141 may include different structures that can selectively and releaseably fix the relative longitudinal position of the two together at different relative positions, such as a plurality of holes upon the bars with a pin that is slidable therethrough, a clamping structure on the first bar that can engage the adjustment bar 144, or the like.

The bar 140, including the first bar 141, second bar 142, collar 145, and/or the adjustable bar 144 (in combination) can be slidably attached to the bulkhead 100 by a plurality of angle brackets 160 that are rigidly mounted to the bulkhead 100. The angle brackets 160 include a base that is fixed to the bulkhead and a flange that defines an opening through which the portion of the bar 140 extends therethrough. In some embodiments, the opening might be elliptical or another geometry, and sized such that the bar 140 easily and smoothly slides through the openings, but adequately supports the bar 140 with some play therebetween to account for tolerances, and to allow for some movement or deformation due to bumpy travel or deformation over time with continued use.

In some embodiments, one or both opposite ends of the bar 140 includes, or operatively engages (through intermediate structure) jack mounts 149 that are configured to engage slots or other structures that are included within vertical or horizontal tracks (or logistics posts) mounted upon the opposite first and second side walls 131 (the second side wall is similar) of the container.

The collar 145 is best shown in FIG. 5. The collar 145 includes an internal volume 145a into which a first end 141a of the first bar 141 extends and a first end 142a of the second bar 142 also extends. As discussed above, the collar 145 may be rigidly fixed to one of the first or second bars 141, 142, with the collar 145 being fixed to the bar with a plurality of bolts and nuts 151 (collectively) depicted in FIG. 5, or with similar fasteners, or adhesive, or welding, or the like.

Figure 6:
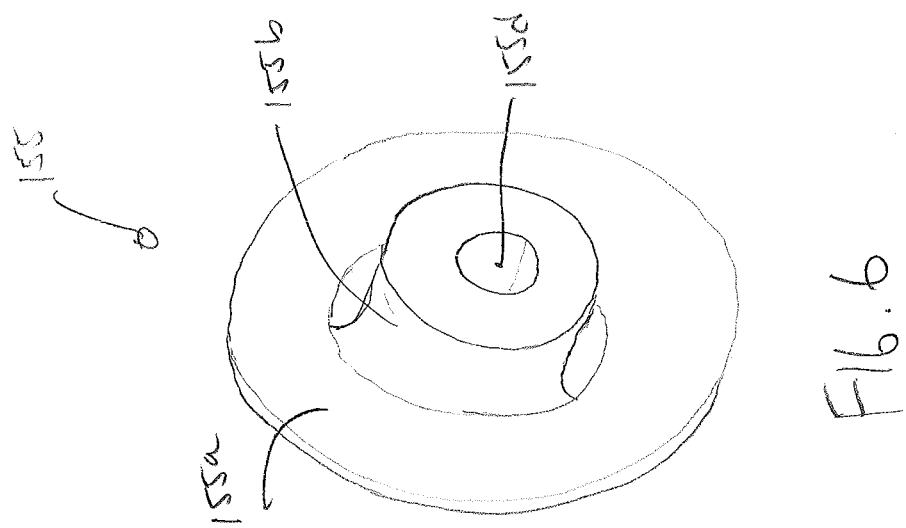
FIG. 6 is a perspective view of a holder usable within the collar of FIG. 5.

The collar 145 additionally encloses an elongate bolt 154 that is aligned in parallel to the longitudinal axis 145b of the collar 145. The bolt 154 includes a head 154a, a shaft 154c, and a threaded end 154b that receives a nut thereon. A holder 155 is disposed within the collar 145 such that a bearing surface 155a of the holder 155 engages a bearing surface of the head 154a of the bolt 154. The holder 155 further includes a body 155b that extends away from the head 154a of the bolt 154, and a central aperture 155d through which shaft 154c of the bolt 154 extends. In some embodiments, the holder 155 may be formed as shown in FIG. 6, with a bearing surface 155a that is circular and includes a diameter that is just smaller than the smaller of the width or depth of the inner volume 145 of the collar 145. In other embodiments shown in FIG. 7, the holder 155 may include a bearing surface 155a that is rectangular or square and is formed with dimensions that are just smaller than the dimensions of the inner volume of the collar 145. In still other embodiments, the bearing surface may be other shapes that are similar to and just smaller than the inner surface of the collar 145, such that the holder 155 can slide within the collar 145.

A second holder 155 may be provided and may be disposed in a spaced apart manner from the first holder 155, with a spring 158 disposed between the bearing surfaces 155a of each holder 155. In some embodiments, the second holder 155 may be disposed such that the body 155b of the second holder 155 faces the body of the first holder 155. The mechanism within the collar 145 is normally arranged such that the spring 158 may be compressed to a smaller length than its nominal length. In some embodiments, the outer diameter of the body 155b of each holder is just smaller than an inner diameter of the spring 158 (when the spring 158 is at its nominal length), such that the spring 158 is supported in an orientation that is parallel with the longitudinal axis 145b of the collar 145 that extends therethrough, and such that the opposed ends of the spring 158 are supported by the body 155b of each holder 155.

A spacer 161 may be disposed along the shaft 154c of the bolt 154 with an end of the spacer 161 in engagement with the bearing surface 155a of the second holder 155 (specifically engaging the side if the bearing surface 155a opposite from the side from which the body 155b extends). The opposite side of the spacer 161 may contact a washer 157 (or in some embodiments the bearing surface of third holder 155). The opposite side of the washer 157 may contact a bearing surface of a nut which is threaded onto the threaded portion 154b of the bolt 154. As shown in FIG. 5, the bearing surface 155a of the second holder 155 may be disposed within the collar 145 to contact the end face 142z of the portion of the second bar 142 that extends within the collar 145. This engagement limits any travel of the second holder 155 within the collar in the left direction (as depicted on FIG. 5). As can be appreciated with reference to FIG. 5, the position of the nut upon the shaft 154c of the bolt 154 determines the amount (if any) of initial compression of the spring 158.

As can be understood with reference to FIG. 5, the end of the first bar 141 is received within the internal volume 145a of the collar 145. During use, the first bar 141 is positioned within the collar 145 such that the end face 141z of the first bar 141 engages the bearing surface 155a of the first holder 155.

In some embodiments, during use, the bar 140 may be imparted with forces (either forces transferred to the bar from the side walls of the container, or forces transferred to the bar 140 from the bulkhead 100) that occur due to the transport of the container and/or due to shifting of cargo within the container acting upon the bulkhead 100 during transport. In some circumstances, the forces that are ultimately transferred to the bar 140 may compress the bar, i.e. urge to decrease the overall length of the bar 140. In those situations, the end face 141z of the first bar 141 may be pressed within the collar 145 toward the second bar 142, and force imparted upon the first bar 141 is transferred to the bearing surface 155a of the holder 155. This force from the first bar 141 urges the first holder 155 linearly within the collar 155 and toward the second holder 155. As discussed above, the second holder 155 is prevented from translating within the collar 145 toward the second bar 142, due to engagement between the bearing surface 155a of the second holder and the end face 142z of the second arm 142, and therefore the movement of the first holder 155 causes the spring 158 to become compressed. The compression of the spring 158 provides an increasing force resisting the movement of the first bar 141 toward the second bar, with the resisting force provided by the spring 158 upon the first bar 158 being proportional to the spring constant and the amount of compression of the spring, which is a well-known relationship in the art. This compression of the spring 158 may be cyclical, or may be maintained for an extended duration depending upon the type of force that is ultimately transferred to the bar 140 that urges its shortening. In situations where the input force to the bar 140 is removed, the spring 158 expands due to the allowed release of the internal energy stored within the spring, and the expansion of the spring 158 causes the first bar 141 to slide away from the second bar 142 (as directed by the first holder 155).

In some alternative embodiments, the bar 140 may only include a first bar 141, a second bar 142, and a collar 145 disposed therebetween, i.e. no adjustable bar 144 is provided. In these embodiments, the bar 140 may be fixed to the retaining structures on the opposite side walls of the container by initially compressing the overall length of the bar 140 by pulling the first bar 141 toward the second bar 142, thereby compressing the spring 158 disposed within the collar 145 as discussed above. The first bar is continuously urged toward the second bar 142 until the length of the bar 140 is short enough to allow both opposite jack mounts 149 (or similar mounting structures that can interact with conventional mounting track or fixtures known in the art) to engage their corresponding receipt structures on the opposite side walls, to fix the bulkhead 100 within the container 1. One or both of the first and second bars 141, 142 may include handles fixed thereto that allow for the user to apply sufficient force to the first bar 141 (and potentially to both bars 141, 142 toward each other) in the direction toward the second bar 142 to compress the spring 158 within the collar 145. In some embodiments, once the ends of the bar 140 are properly engaged with the mounts on the side walls of the container, the bars 141, 142 are released. As with the embodiment described above that includes the adjustable bar 144, the presence of the spring 158 between the first and second bars 141, 142 allows for some relative movement of the first and second bars 141, 142 when installed that allows the overall length of the bar 140 to slightly change when sufficient external forces are imparted upon the bars such as during transit.

The bulkhead assembly can be installed as follows:

In a cargo container 1 having a first wall 131, a second wall (opposite to but similar to the first wall 131), a top 133, and a bottom 134, the first bulkhead section 101 and second bulkhead section 102 can be placed adjacent one another in the desired position within the container, normally after the front portion of the cargo container or second compartment 12 has been loaded with cargo. The first bar 141 and the adjustable bar 144 are disposed through the openings of the angle brackets 160 of the second bulkhead section 102, and the jack mount 149 upon the exposed end of the adjustable bar 144 is secured to the receiving structure (such as track 180) in the closest side wall to the second bulkhead section 102. At this time, the end of the first bar 141 (opposite from the adjustable bar 144) does not extend past the edge of the first bulkhead 102 next to the edge of the second bulkhead 101.

Similarly, the second bar 142 and the collar 145 are fixed together such that the combined length is less than the width of the first bulkhead 101, and the second bar 142 is slid through the openings of the angle brackets 160 fixed to the first bulkhead 101, and the jack mount 149 upon an end of the second bar 142 is fixed to the receiving structure in the side wall. In some embodiments, it may necessary or convenient to connect the respective first and second bars 141, 142 to their intended bulkhead sections 102, 101 before the bulkhead sections are installed to form the overall bulkhead 100.

After the jack mounts of the opposite second bar 142 and the adjustable bar 144 are each fixed, the paddle handle 154 of the adjustable bar 144 is released from the rack gear 152 and the length of the adjustable bar 144 is extended, which urges the end of the first bar 142 into the internal volume 145a of the collar 145. The adjustable bar 144 is normally lengthened until resistance to movement of the first bar 141 is felt, which indicates that the end face 141z of the first bar 141 has engaged the bearing surface 155a of the first holder 155. The paddle handle 154 may then be manipulated to mesh with the teeth of the rack gear 152, which fixes the length of the bar 140. In some embodiments, the bar 140 may be fixed at a length where the first bar 141 causes some compression of the spring 158 within the collar 145, which urges each of the opposite jack mounts 149 into their respective receiving structure on the side walls.

In some embodiments, two or more bars 140 are used to support the bulkhead 100, and in those embodiments, the bars 140 may be aligned in opposite directions, as shown in FIG. 8. As shown, extending the bars 140 in opposite directions allows for the side wall of the container that engages with the adjustable bar 144 to be alternated. Such embodiment may be advantageous for installation and security purposes, such as minimizing the chance that a foreign object within the compartment that could interact with one of the paddle handles 154 to unintentionally release the engagement between the paddle handle 154 and the rack gear 152 would interact with both paddle handles 154 on opposite sides of the bulkhead 100.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A system for supporting a removable wall within a space, comprising:

a bar assembly, comprising an elongate first bar that extends between first and second ends, the first end of the first bar operatively engaged with a first connector that is configured when installed within the space to engage a receipt structure on a first side wall of the space;

an elongate second bar that extends between first and second ends, the first end of the second bar operatively engaged with a second connector that is configured when installed within the space to engage a receipt structure on a second side wall of the space, opposite from the first side wall;

a collar with first and second opposite open ends and an inner volume, the second end of the first bar configured to extend through the first open end and be fixed within the inner volume, the collar further comprising a bolt disposed within the inner volume of the collar, and first and second holders disposed with a shaft of the bolt extending therethrough, wherein the first and second holders comprise bearing surfaces, wherein an end face of the first bar engages the bearing surface of the second holder and an end face of the second bar engages the bearing surface of the first holder when the second bar is disposed within the internal volume of the collar.

2. The system of claim 1, further comprising a spring disposed between the respective bearing surfaces of the first and second holders.

3. The system of claim 2, wherein the spring is compressed smaller than a normal length.

4. The system of claim 2, wherein the spring is configured to be compressed smaller than a normal length when the second bar is urged linearly toward the first bar within the collar.

5. The system of claim 1, wherein a nut is threadably received upon an end of the shaft of the bolt and a spacer is disposed over the shaft of the bolt and between a bearing surface of the nut and the bearing surface of the second holder.

6. The system of claim 1, wherein each of the first and second holders comprise a body, and a spring is disposed between respective ones of the bearing surfaces of the first and second holders, wherein opposite ends of the spring are positioned around the respective body of each of the first and second holders, and an outer diameter of each body is just smaller than an inner diameter of the ends of the spring when the spring is in its uncompressed length.

7. The system of claim 1, further comprising an adjustment bar that is slidably received within an end of the second bar, wherein the adjustment bar includes a first locking structure and the second bar includes a second locking structure, wherein the second locking structure is configured to be selectively engagable with the first locking structure.

8. The system of claim 7, wherein the first locking structure is an elongate rack gear, and the second locking structure is a movable handle with one or more teeth that mesh with teeth of the rack gear when the second locking structure engages the first locking structure.

9. The system of claim 8, wherein the second locking structure is a handle that includes a first position biased away from engagement with the first locking structure, and a second position biased toward engagement with the first locking structure.

10. The system of claim 1, further comprising a second bar assembly, with the second bar assembly disposed in an opposite orientation from the first bar assembly, wherein, when installed in the space, a second bar assembly is disposed upon the second side wall of the space opposite from the first side wall of the space such that a first bar of the second bar assembly operatively engages the second side wall, and a second bar of the second bar assembly engages the first side wall.

11. A bar system for supporting a removable wall within a space, comprising:

a bar assembly, comprising an elongate first bar that extends between first and second ends, the first end of the first bar operatively engaged with a first connector disposed at the first end thereof;

an elongate second bar that extends between first and second ends, the first end of the second bar operatively engaged with a second connector disposed at the first end thereof;

a collar with first and second opposite open ends and an inner volume, the second end of the first bar configured to extend through the first open end and be fixed within the inner volume, the collar further comprising a bolt disposed within the inner volume of the collar, and first and second holders disposed with a shaft of the bolt extending therethrough, wherein the first and second holders comprise bearing surfaces, wherein an end face of the first bar engages the bearing surface of the second holder and an end face of the second bar engages the bearing surface of the first holder when the second bar is disposed within the internal volume of the collar.

12. The system of claim 11, further comprising a spring disposed between the respective bearing surfaces of the first and second holders.

13. The system of claim 12, wherein the spring is compressed smaller than a normal length.

14. The system of claim 12, wherein the spring is configured to be compressed smaller than a normal length when the second bar is urged linearly toward the first bar within the collar.

15. The system of claim 11, wherein a nut is threadably received upon an end of the shaft of the bolt and a spacer is disposed over the shaft of the bolt and between a bearing surface of the nut and the bearing surface of the second holder.

16. The system of claim 11, wherein each of the first and second holders comprise a body, and a spring is disposed between respective ones of the bearing surfaces of the first and second holders, wherein opposite ends of the spring are positioned around the respective body of each of the first and second holders, and an outer diameter of each body is just smaller than an inner diameter of the ends of the spring when the spring is in its uncompressed length.

17. The system of claim 11, further comprising an adjustment bar that is slidably received within an end of the second bar, wherein the adjustment bar includes a first locking structure and the second bar includes a second locking structure, wherein the second locking structure is configured to be selectively engagable with the first locking structure.

18. The system of claim 17, wherein the first locking structure is an elongate rack gear, and the second locking structure is a movable handle with one or more teeth that mesh with teeth of the rack gear when the second locking structure engages the first locking structure.

19. The system of claim 18, wherein the second locking structure is a handle that includes a first position biased away from engagement with the first locking structure, and a second position biased toward engagement with the first locking structure.

* * * * *